(12) United States Patent
Hanlon

(10) Patent No.: US 10,506,694 B2
(45) Date of Patent: Dec. 10, 2019

(54) ELECTRO STATIC DISCHARGE (ESD) SAFE LINER DEVICE FOR VARIOUS TOTES AND OTHER CONTAINERS

(71) Applicant: James Hanlon, Noblesville, IN (US)

(72) Inventor: James Hanlon, Noblesville, IN (US)

( * ) Notice: Subject to any disclaimer, the term of this patent is extended or adjusted under 35 U.S.C. 154(b) by 120 days.

(21) Appl. No.: 15/881,788

(22) Filed: Jan. 28, 2018

(65) Prior Publication Data

US 2018/0220517 A1  Aug. 2, 2018

Related U.S. Application Data

(60) Provisional application No. 62/451,078, filed on Jan. 27, 2017.

(51) Int. Cl.
| | |
|---|---|
| *H05F 3/02* | (2006.01) |
| *H01B 1/02* | (2006.01) |
| *C08K 3/04* | (2006.01) |
| *B65D 90/46* | (2006.01) |
| *B65D 90/04* | (2006.01) |

(52) U.S. Cl.
CPC .............. *H05F 3/02* (2013.01); *B65D 90/046* (2013.01); *B65D 90/46* (2013.01); *C08K 3/04* (2013.01); *H01B 1/023* (2013.01); *H01B 1/026* (2013.01); *C08K 2201/001* (2013.01)

(58) Field of Classification Search
CPC ......... H05F 3/02; B65D 90/046; B65D 90/46; H01B 1/026; H01B 1/023; C08K 3/04
USPC ........................................................ 361/220
See application file for complete search history.

(56) References Cited

U.S. PATENT DOCUMENTS

| | | | |
|---|---|---|---|
| 4,606,968 A | 8/1986 | Thornton et al. | |
| 5,514,299 A | 5/1996 | Kalwara | |
| 6,017,610 A | 1/2000 | Abe et al. | |
| 6,242,094 B1 | 6/2001 | Breznak et al. | |
| 6,283,320 B1 * | 9/2001 | Patch ................... | B65D 23/04 215/386 |
| 6,451,407 B1 | 9/2002 | Nickell | |
| 6,675,838 B2 | 1/2004 | Arthurs et al. | |
| 6,682,108 B1 | 1/2004 | Arch | |
| 6,896,828 B2 | 5/2005 | Fox et al. | |
| 7,115,311 B2 | 10/2006 | Arthurs et al. | |
| 7,431,501 B2 | 10/2008 | Main | |
| 7,527,873 B2 | 5/2009 | Kumar et al. | |
| 8,730,676 B2 | 5/2014 | Hirsch et al. | |
| 2004/0086673 A1 | 5/2004 | Arthurs et al. | |
| 2006/0269711 A1 | 11/2006 | Chandra et al. | |

\* cited by examiner

*Primary Examiner* — Dharti H Patel
(74) *Attorney, Agent, or Firm* — John D Ritchison; Ritchison Law Offices, PC

(57) ABSTRACT

An Electro Static Discharge (ESD) Safe Liner device made from Carbon Filled EVA Sheet and Film that provides the ways a liner can provide a safe method to prevent Electro static discharges from containers transporting various materials. Additionally, the Cuff or the thin mil film material fastened to the top of the liner provides a capability where there is enough excess material at the top of the liner which, when removed is than gathered in a variety of methods and contains any residual from the unused material within the liner for proper disposal and no mess. The container liners are for large and small containers and prove themselves extremely efficient.

12 Claims, 10 Drawing Sheets

Liner with components

Figure 1:
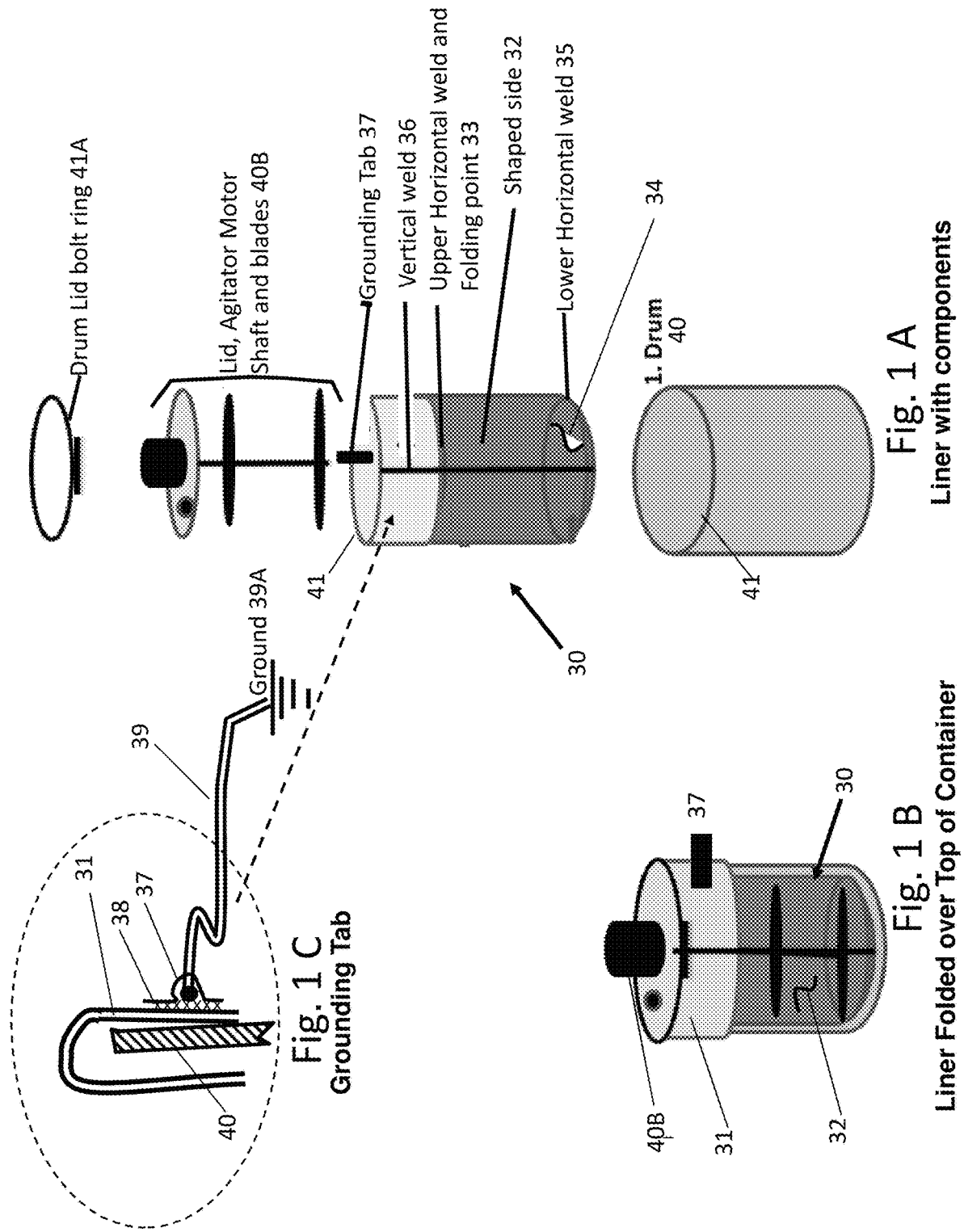

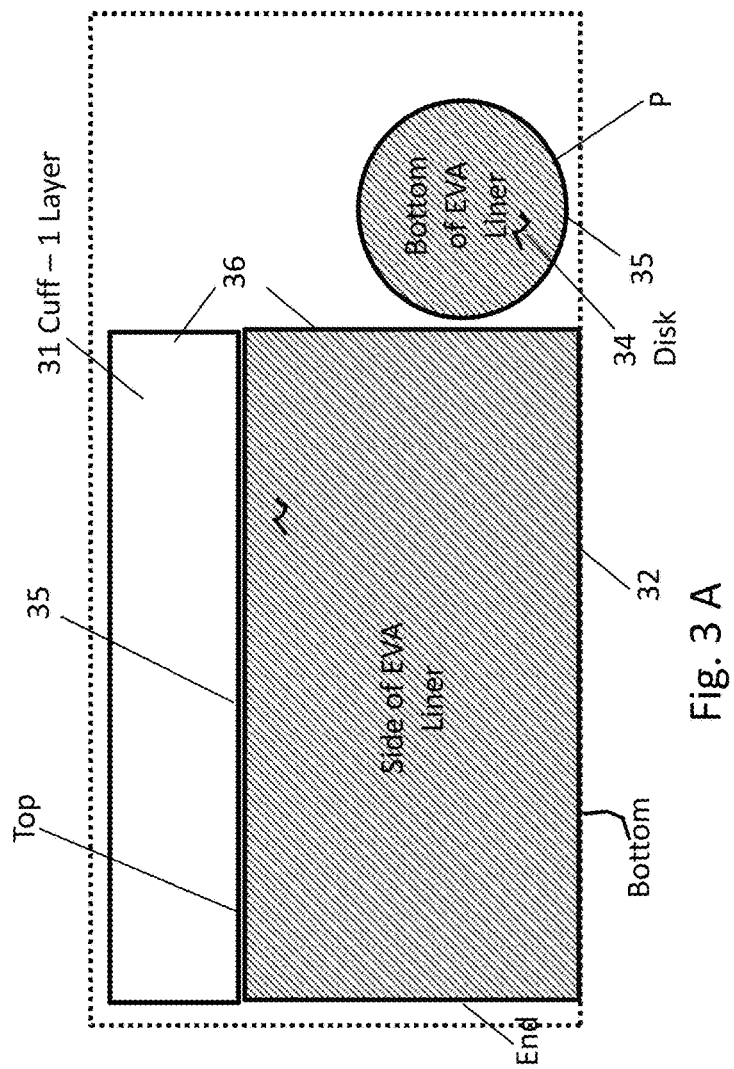
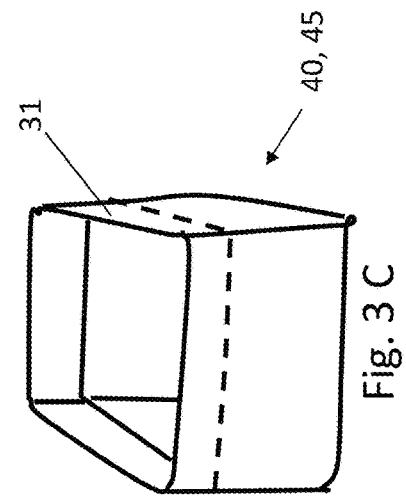
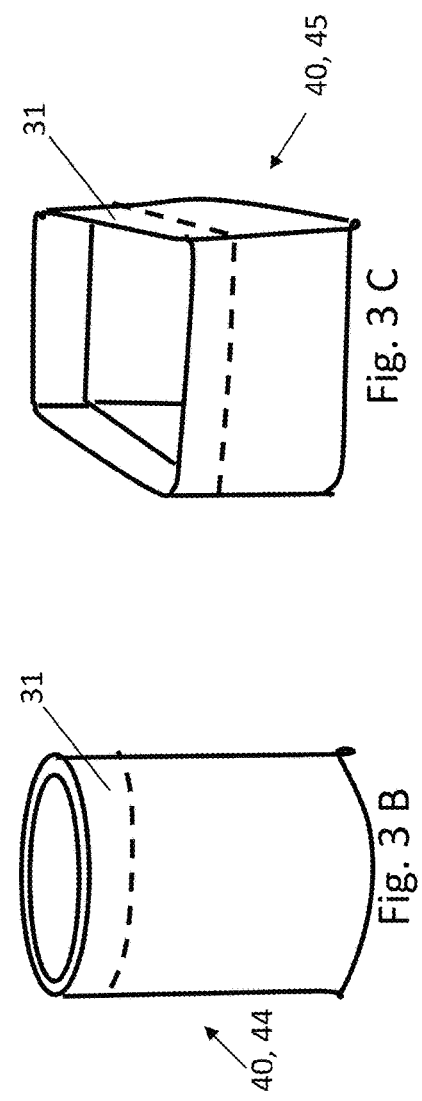

| No. | | Carbon Filled EVA | | Carbon Filled Film | |
|---|---|---|---|---|---|
| | | Min. | Max | Min | Max |
| 1 | Weight (sq./yd.) | 18 oz. | 22 oz. | 4oz. | 6oz. |
| 2 | Thickness (mil) | 12 | 15 | 2 | 3 |
| 3 | Conductivity Levels (ohms) | $10^4$ | $10^9$ | $10^4$ | $10^9$ |
| 4 | E' weld capable | ✓ | ✓ | ✓ | ✓ |
| 7 | Solvent Resistance | N/A | N/A | ✓ | ✓ |
| 8 | Tensile strength ASTM-882 MD> 200PSI | ✓ | ✓ | ✓ | ✓ |
| 9 | Elongation ASTM D-882 MD 150% | ✓ | ✓ | ✓ | ✓ |
| 10 | Tear Strength ASTM-D-882 >400 lbs./in. | ✓ | ✓ | ✓ | ✓ |
| 11 | Dart Impact ASTM-D-1709 250 to 700 grams @ 26" drop | ✓ | ✓ | ✓ | ✓ |
| 12 | Mullen Burst ASTM-D-774 20-60 PSI | ✓ | ✓ | ✓ | ✓ |

Fig. 5 B
Requirements

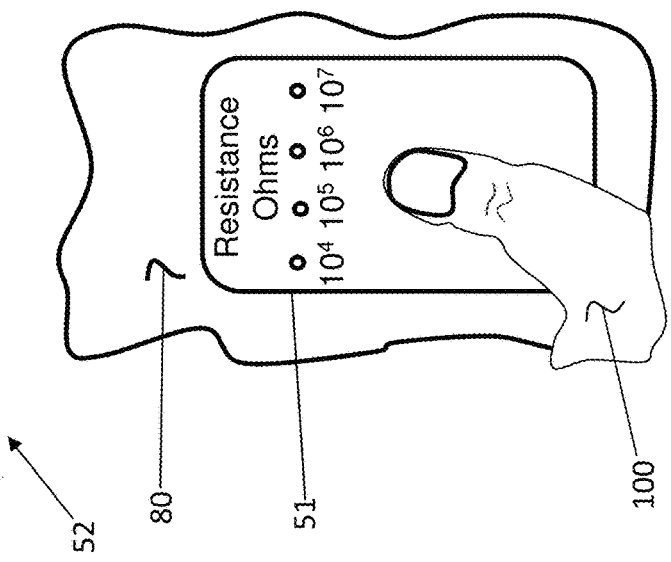

Fig. 5 A
Resistivity Meter

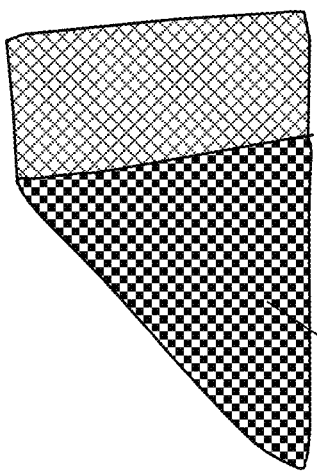
Fig. 6A
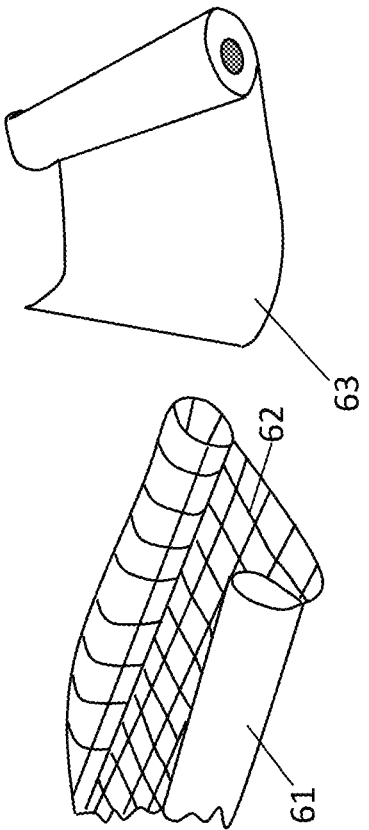
Fig. 6B
Fig. 6C
Fig. 6D
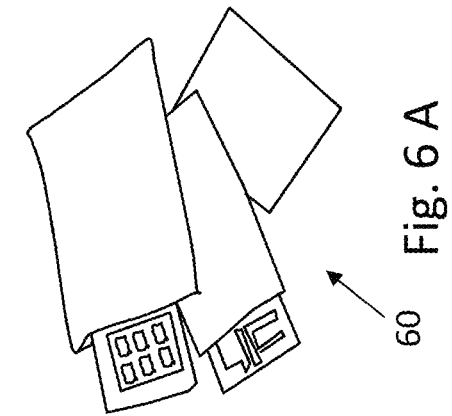
Fig. 6E
Blow Mold LDPE Insulative
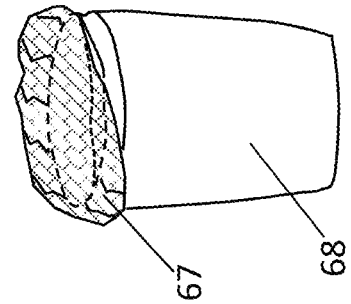
Fig. 6F
Blow Mold LDPE Dissipative
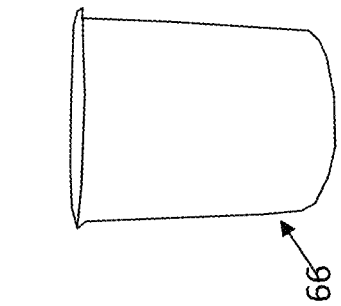
Fig. 6G
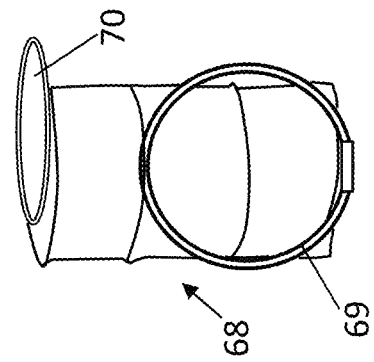
Fig. 6H
Standard 55 Gallon Drum

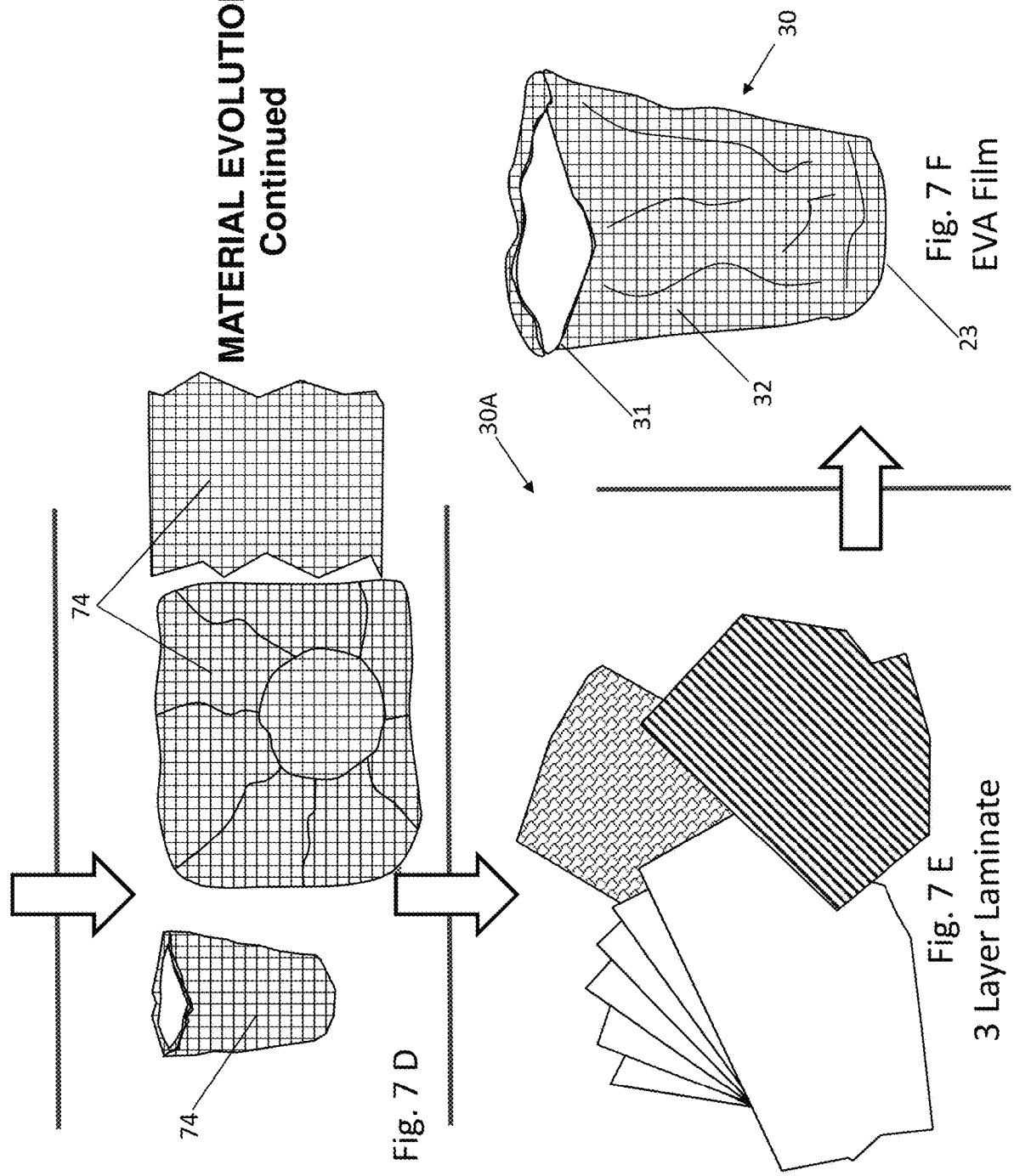

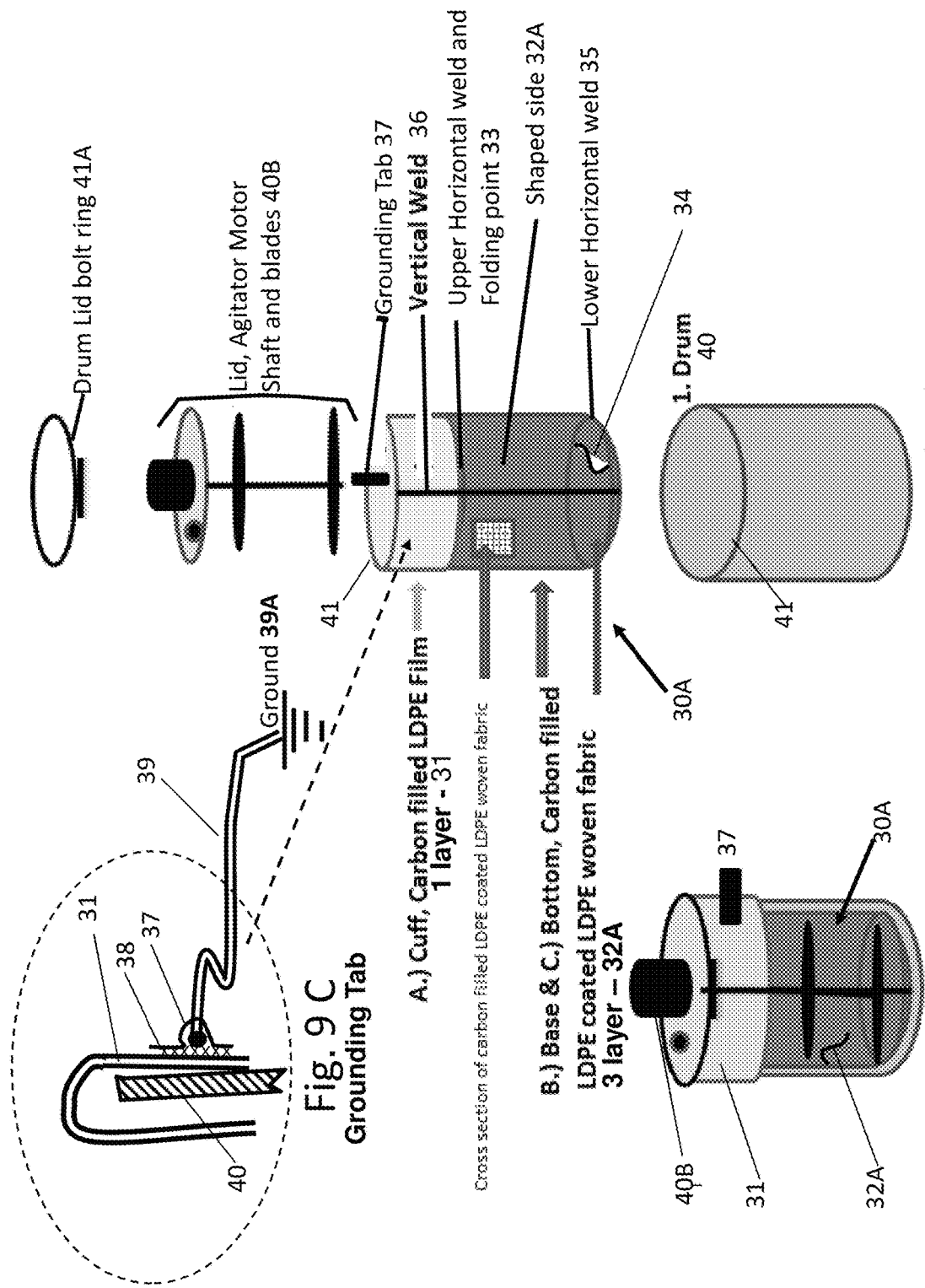

ELECTRO STATIC DISCHARGE (ESD) SAFE LINER DEVICE FOR VARIOUS TOTES AND OTHER CONTAINERS

CROSS-REFERENCE TO RELATED APPLICATIONS

This application claims the benefit of U.S. Provisional Patent Application with Ser. No. 62/451,078 filed Jan. 27, 2017, by James Hanlon and entitled "Electro Static Discharge (ESD) Safe Liner Device for various totes and other containers".

FIELD OF INVENTION

This invention relates to an Electro Static Discharge (ESD) Safe Liner for various totes and other containers holding various volatile materials in general. This invention is directed generally to containers, and more particularly to intermediate bulk containers (IBCs) or liners with safety features for anti-static and electrostatic discharge (ESD) involving static dissipation. It relates to a container liner for protecting a reusable or recyclable rigid container from contamination or exposure to a flammable liquid or ones that are susceptible to ESD which is being contained therein. More particularly, the invention is directed toward providing a static dissipative container liner which will serve as an effective barrier for preventing a liquid which is being held within a metal or conductive container from contacting the walls thereof, and which has suitable static dissipative properties to reduce or eliminate the risk of electrostatic discharges which could ignite flammable vapors and/or liquid contacting the container liner.

This can relate to the manufacture of flexible intermediate bulk containers liners (hereinafter bulk bags) for handling flowable materials, and in particular to the manufacture of static dissipative films for use in bulk bag liners (for dry and wet materials subject to building up a static charge and potential electrostatic discharge) and to the manufacture of static dissipative fabrics for use in bulk bags. This device and invention relates generally to the transportation of devices sensitive to electrostatic discharge (ESD), and more particularly to a transportable bag assembly that provides ESD protection for the contents thereof. These include devices for reduced energy of electrostatic discharge that are suitable for use in combustible environments. This invention finally relates to groundable type flexible fabric containers with a reduced energy of electrostatic discharge suitable for use in a combustible environment.

FEDERALLY SPONSORED RESEARCH

None.

SEQUENCE LISTING OR PROGRAM

None.

BACKGROUND—FIELD OF INVENTION AND PRIOR ART

However, as far as known, there are no Electro Static Discharge (ESD) Safe Liner devices for various totes and other containers (holding various volatile materials) which utilize a liner made of static dissipative construction with an extended collar of similar material used for containment. It is believed that this static dissipative device/product is unique in its design and technologies.

Background

This background as to Electro Static Discharge (ESD) Safe Liner devices for various totes and other containers (for dry and wet materials subject to building up a static charge and potential electrostatic discharge) should prove to be useful. First and foremost: (1) Container Liners are not new! (2) Static dissipative Container Liners are not new! (3) Pliable, Film, Static Dissipative, Container Liners are not new! And (4) Rigid, Static Dissipative, Container Liners are not new!

This invention relates to methods and apparatuses for containing bulk flowable materials for transportation, storage, loading and unloading; it further relates to product discharge assemblies used with such apparatuses. Examples of such materials are chemicals and paints, which present a significant cleaning challenge when the tank or container is to be reused, and which also may present environmental concerns. The tank or container generally takes the form of a durable outer shape-retaining portion and having an inner flexible and disposable liner. After transportation and/or storage, the flowable materials are emptied from the container, and the durable portion of the container is reused. The disposable liner along with all residual is contained and removed from the durable portion and then properly disposed of. The container is then prepared for the receipt of a new liner and reuse of the outer, usually more rigid container that acts as the exoskeleton of the overall containing system.

Over the past three decades there has been increasing interest in the use of flexible intermediate bulk containers (hereinafter bulk bags) for handling flowable materials such as chemicals, minerals, fertilizers, foodstuffs, grains and other agricultural products, etc. The advantages resulting from the use of bulk bags include low weight, reduced cost, versatility, and, in the case of reusable receptacles, low return freight costs. Fabrics are often utilized in the construction of various types of bulk containers where strength, flexibility and durability are important. Originally, such containers were fabricated from natural fibers. More recently, however, synthetic fibers manufactured from polypropylene, polyethylene or other polymeric materials have come into almost exclusive use. The popularity of synthetic fibers can be attributed to the fact that they are generally stronger and more durable than their natural fiber counterparts. Even with the advances in fabric construction resulting from the shift from natural to synthetic fibers, fabrics in general possess qualities that render their use undesirable in certain applications. For example, the friction that occurs as dry flowable materials are handled by fabric receptacles tends to cause a significant build-up and retention of static electric charge within the receptacle. Discharge of the generated static electric build-up is often difficult, if not impossible, to control because fabrics are generally not electrically conductive materials. However, controlled discharge is imperative as static electric potential poses a significant danger of generating an electrical spark which, in the presence of certain flammable or explosive materials, could resulting a fire or explosion.

In an effort to address the undesirable static electric discharge characteristic of fabrics, bag manufacturers covered one side of the fabric with a metallic foil-like layer. An adhesive was applied to affix the foil-like layer to the plastic fabric. The foil-like layer was typically comprised of aluminum or some other electrically conductive metal. The foil-covered fabric was then used to construct the receptacle, for example, with the foil side of the fabric comprising the interior surface. The foil layer provided an electrically conductive surface exposed to the flowable materials through which static electricity generated during material handling and was discharged to an appropriate ground. While adequately discharging static electric build-up if undamaged, the foil-like layer was susceptible to abrasion, tearing and separation from the fabric layer through normal use of the receptacle. For example, in filling, transporting and/or emptying of foil-covered fabric receptacles, abrasion between the flowable material and the foil-like layer tended to cause the foil-like layer to tear and/or separate from the fabric layer. The cumulative effect of such abrasion quickly reduced the effectiveness of the foil-like layer as a static electric discharge surface. Furthermore, tearing of the foil often resulted in a release of foil particles and flakes from the fabric, thereby contaminating the contained flowable materials.

Problems Solved

The improvement and problem solved as to Electro Static Discharge (ESD) Safe Liner for various totes and other containers (for dry and wet materials subject to building up a static charge and potential electrostatic discharge) include: 1.) A container material that is resistant to the variety of coatings chemistry causing container material failure; 2.) A liner that was compatible to the container from a contamination standpoint; and 3.) A liner that is a safe material from an ESD standpoint where volatile chemicals were present. Certainly the six categories addressed are improved dramatically by this Electro Static Discharge (ESD) Safe Liner. Quality, Cost, Delivery, Safety, Morale, and Environment is as an acronym QCDSME.

Quality—Q: The ESD Safe Liner provides a virgin environment that is free of contaminants. Liners provide consistently clean atmosphere without the need for harmful solvents.

Cost/Time Savings—C: The ESD Safe Liner eliminates the cost of cleaning containers, shipping and receiving containers to and from cleaning, and disposing of chemicals used for cleaning. These ESD safe liners also eliminate quality issues from contamination so end users will no longer return unwanted product. Since these liners eliminate the third party cleaning, the customer will have more containers at their disposal and a direct to-and-from line with their customer, reducing shipping costs and lead times.

Delivery—D: The usage of ESD Safe Liners increase quality and saves all party's involved time and money. With a virgin environment every time, the products shipped in ESD safe liners will be contaminant free and more cost effective.

Safety—S: The ESD Safe Liner is carbon loaded so the material can be safely grounded to eliminate static electricity that may occur during loading, transport, mixing, etc. The specially designed grounding tab on the top side of the liner can be run directly to a safe ground source.

Morale—M: The ESD provides a safer workplace and addresses environmental issues with wasted product. In addition, the liners provide a cleaner workplace free of debris, dust and other particulate. This improves the attitude of employees by these positives steps in the workplace.

Environmental—E: The ESD Safe Liner eliminates solvent usage/disposal during the cleaning process of IBC's. Remove used ESD Safe Liner and replace with a new liner. Used liner and any residual material inside can be used as an energy source.

Prior Art

A novelty search revealed the following prior art:

| Item No. | Pat. No. | Name | Inventor | Year Issued |
|---|---|---|---|---|
| 1 | US2004/0086673 | Anti-Static Woven Flexible Bulk Container | Arthurs et al. | 2004 |
| 2 | 7,115,311 | Anti-Static Woven Flexible Bulk Container | Arthurs et al. | 2006 |
| 3 | 6,675,838 | Anti-Static Woven Fabric Flexible Bulk Container | Arthurs et al. | 2004 |
| 4 | 8,730,676 | Composite Component and Method For Producing A Composite Component | Hirsch et al. | 2014 |
| 5 | 7,527,873 | Thermally And Electrically Conductive Interface | Kumar et al. | 2009 |
| 6 | 7,431,501 | Bag Assembly Providing Electrostatic Discharge Protection | Main | 2008 |
| 7 | US2006/0269711 | Flexible Intermediate Bulk Container Having Optimum Discharge Of Hazardous Charge | Chandra et al. | 2006 |
| 8 | 6,896,828 | Electrically Conductive Thermoplastic Polymer Composition | Fox et al. | 2005 |
| 9 | 6,682,108 | Bottom Draining Tank With Disposable Liner And Method | Arch | 2004 |
| 10 | 6,451,407 | Anti-Static Films And Anti-Static Fabrics For Use In Manufacturing Bulk Liners And Bulk Bags | Nickell | 2002 |
| 11 | 6,283,320 | Conductive Plastic Container For Volatile Liquids | Patch | 2001 |
| 12 | 6,242,094 | Electrically Conductive Heterofil | Breznak et al. | 2001 |
| 13 | 6,017,610 | Conductive Laminate | Abe et al. | 2000 |
| 14 | 4,606,968 | Electrostatic Dissipating Fabric | Thornton et al. | 1986 |
| 15 | 5,514,299 | Static dissipative container liner and method of making same | Kalwara | 1996 |

SUMMARY OF THE INVENTION

This invention is an Electro Static Discharge (ESD) Safe Liner for various paint totes and other containers for various applications and uses. Taught here are the ways an Electro Static Discharge (ESD) Safe Liner device can provide a safer method to prevent Electro static discharges from containers transporting various materials. This is a design made from Carbon Filled EVA Sheet and Film that meets all the requirements previously mentioned and adds the bonus of "Containment". The addition of what is termed as a 'Cuff' or the thin mil "film" material fastened to the top of the liner and provides the same capability of a conventional trash can liner when removed from the trash can. There is enough excess material at the top of the liner which is most often draped over the top and down the side of the trash can. When removed it is than gathered in a variety of methods but all with the same thing in mind. "Contain its Contents"! On trash day the streets are lined with them or packaged neatly inside large residential totes. Commercial dumpsters are full of them. Container liners for large and small containers prove they are extremely efficient.

The preferred embodiment of the Electro Static Discharge (ESD) Safe Liner device 30 for various totes and other containers is comprised of: (a) an approximately 12-15 mil thick carbon filled thermoplastic shaped side liner attached directly and contiguously to an approximately 12-15 mil thick carbon filled thermoplastic bottom; (b) a single and an approximately 4 mil thick carbon filled thermoplastic layer and static dissipative cuff contiguously attached to the three layer static dissipative liner; and (c) a grounding tab attached to the cuff by a conductive means for securing wherein the ESD safe liner device is placed interior to a durable container to provide a groundable and removable liner for safeguarding materials held in the container from electrostatic discharges and the like when the liner is attached to a local ground. An alternative embodiment is a three layered laminated sheet with a carbon loaded inner and outer sheet and middle sheet of a woven static dissipative fabric.

The newly invented Electro Static Discharge (ESD) Safe Liner device for various paint totes and other containers may be manufactured at low volumes by very simple means and in high volume production by more complex and controlled systems.

OBJECTS AND ADVANTAGES

There are several objects and advantages of the Electro Static Discharge (ESD) Safe Liner device for various paint totes and other containers. There are currently no known ESD devices that are effective at providing the objects of this invention.

The Electro Static Discharge (ESD) Safe Liner device for various paint totes and other containers has various advantages and benefits:

| Item | Advantages |
|---|---|
| 1 | Is produced from high quality and clean materials |
| 2 | Supports environmental control of solvents |
| 3 | Supports zero waste to land fills |
| 4 | Allows repurposed material and by products |
| 5 | saves cost of chemicals, shipping, more power and product rejections |
| 6 | Provides time saving and more uptime to the service process and equipment |

Finally, other advantages and additional features of the present Electro Static Discharge (ESD) Safe Liner for various paint totes and other containers will be more apparent from the accompanying drawings and from the full description of the device. For one skilled in the containers and liners requiring electro static discharge (ESD) protection, it is readily understood that the features shown in the examples with this product are readily adapted to other types of liners and container requiring protection for ESD.

DESCRIPTION OF THE DRAWINGS—FIGURES

The accompanying drawings, which are incorporated in and constitute a part of this specification, illustrate an embodiment of the Electro Static Discharge (ESD) Safe Liner device for various paint totes and other containers that is preferred. The drawings together with the summary description given above and a detailed description given below serve to explain the principles of the Electro Static Discharge (ESD) Safe Liner device. It is understood, however, that the Electro Static Discharge (ESD) Safe Liner device for various paint totes and other containers is not limited to only the precise arrangements and instrumentalities shown.

FIGS. 1 A through 1 C are sketches of the general preferred embodiment of an electro static discharge (ESD) safe liner for container liner, work top surface and packaging applications as components, as assembled and as an enlarged grounding tab.

Figure 2:
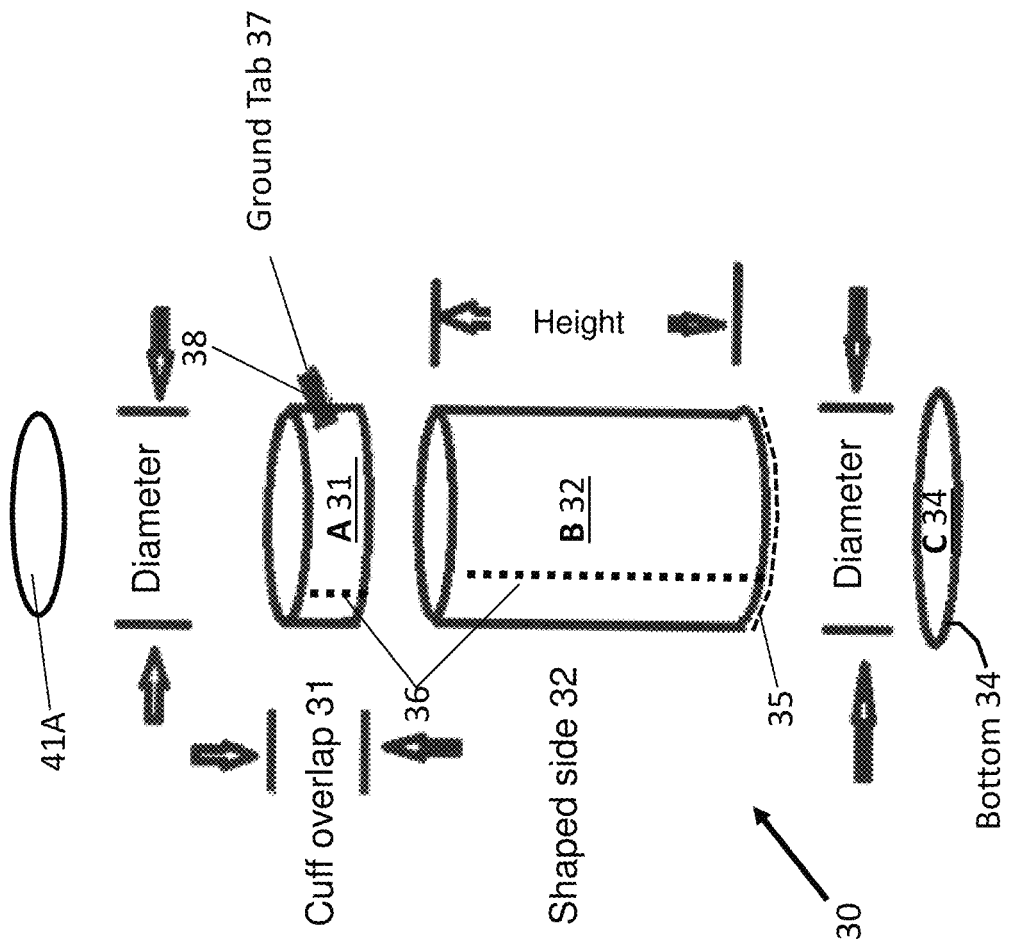

FIG. 2 is another sketch of the general electrostatic discharge (ESD) safe liner device with components and features noted.

FIG. 3 A through 3 C are sketches of the ESD design and typical configuration switch the components and features shown from generally a side and isometric views.

Figure 4:
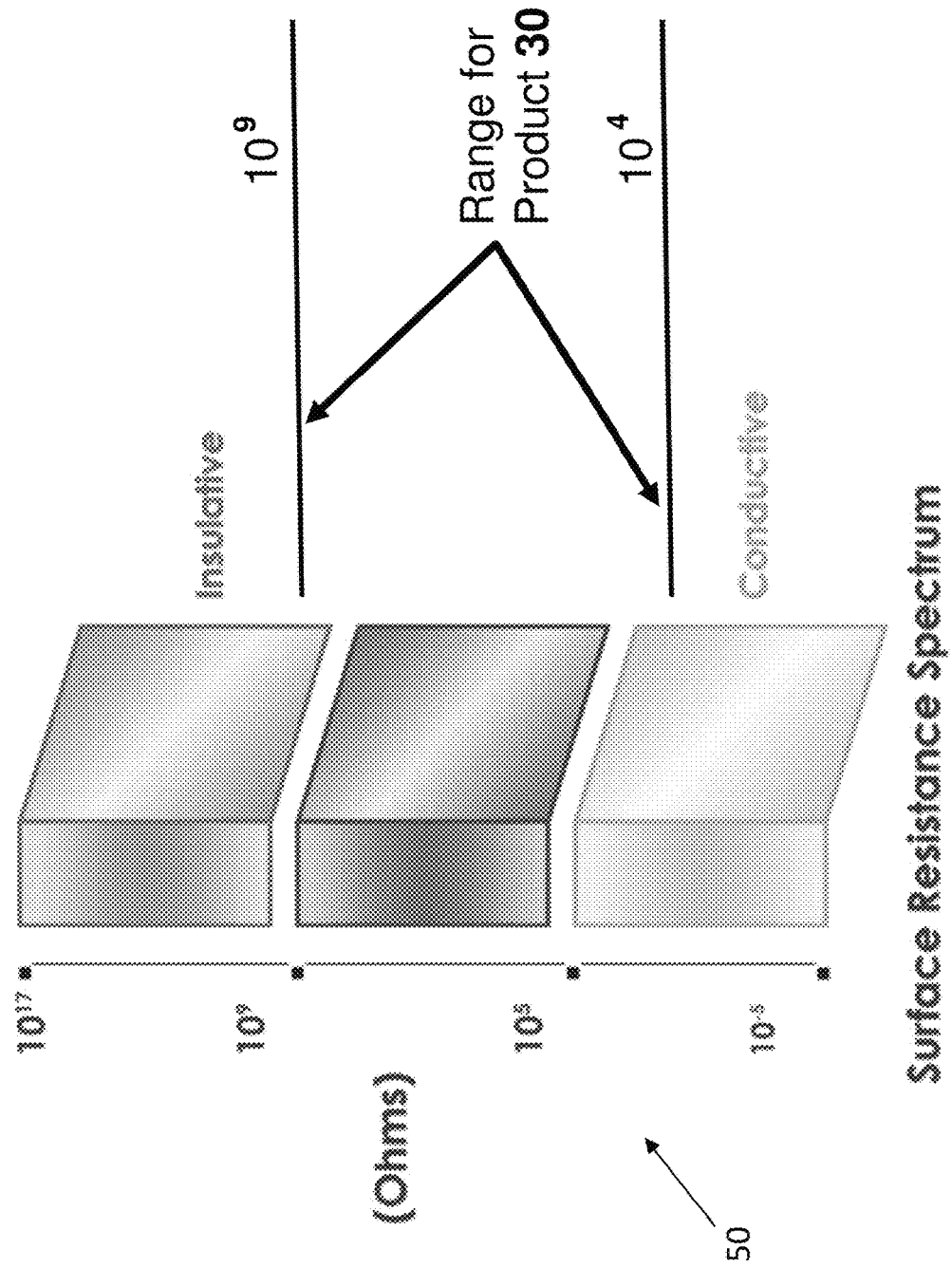

FIG. 4 is a chart of the ESD and surface resistance spectrum.

FIGS. 5 A and 5 B are sketches of a film surface resistivity meter and the recommended ESD requirements.

FIGS. 6 A through 6 H are sketches and comparison of various films and containers for ESD protection.

Figure 7A:
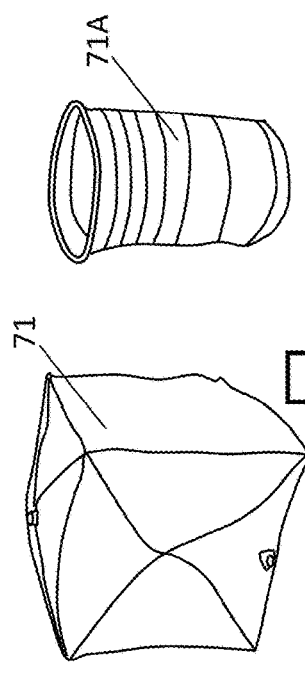
Figure 7B:
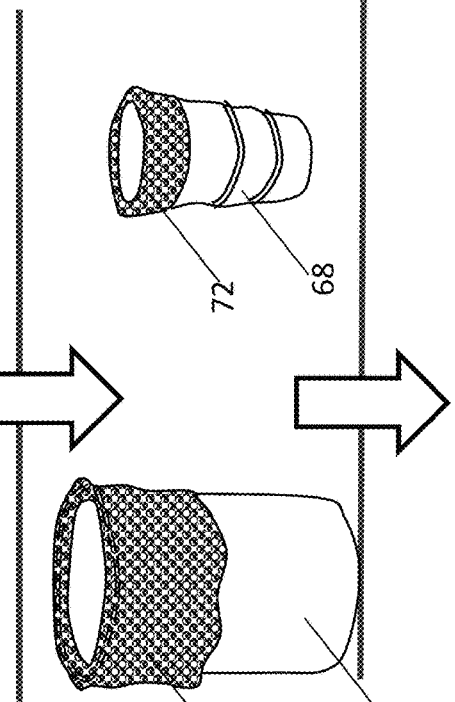
Figure 7C:
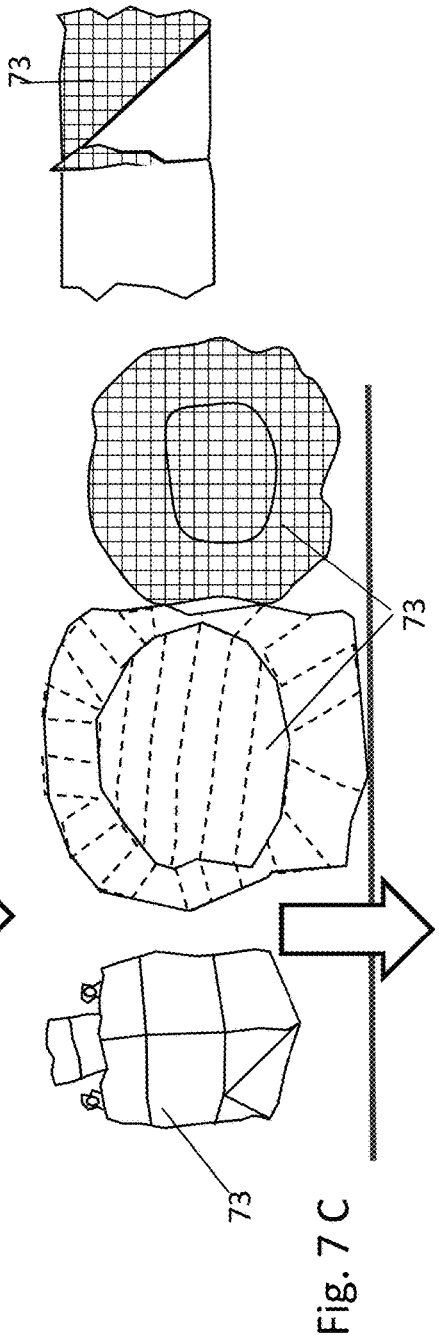

FIGS. 7 A through 7 F are sketches of the material evaluation for achieving an ESD safe liner.

Figure 8:
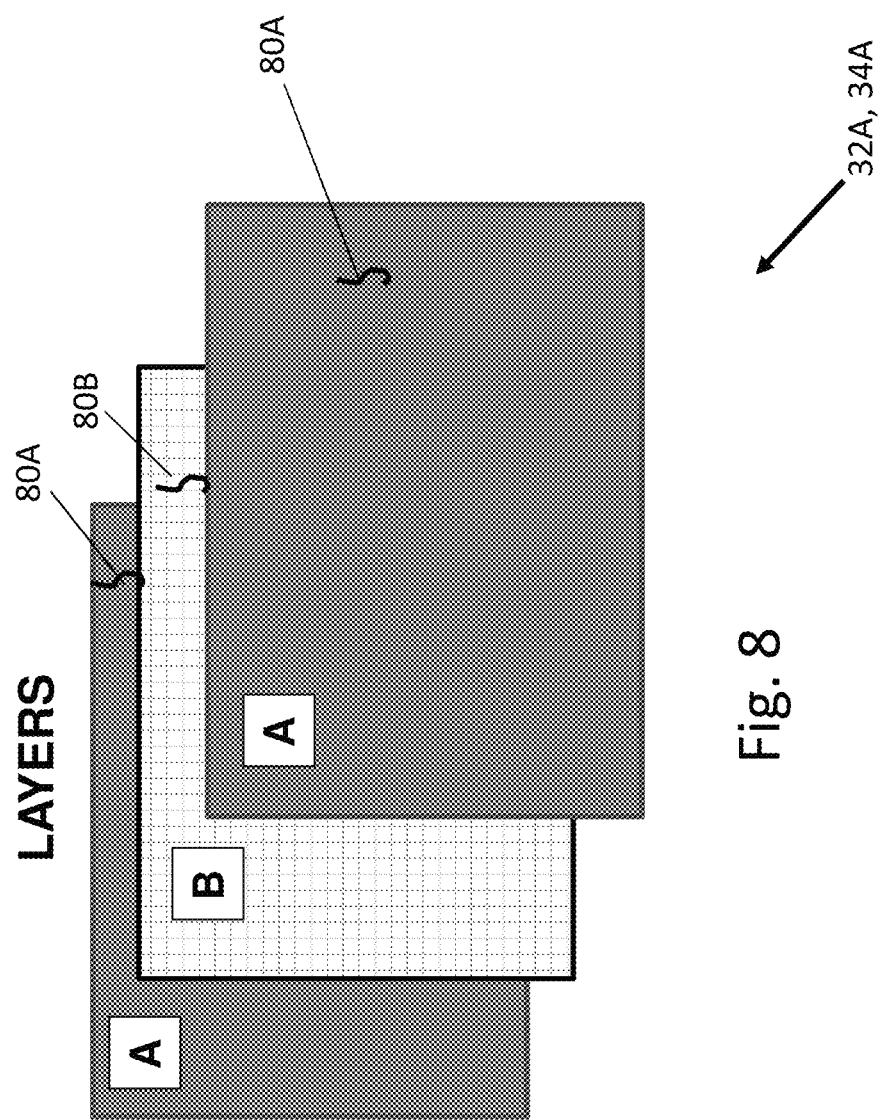

FIG. 8 is a sketch of the layers used to provide the ESD safe liner.

FIGS. 9 A through 9 C are sketches of the general alternative embodiment of a laminate electro static discharge (ESD) safe liner for container liner, work top surface and packaging applications as components, as assembled and as an enlarged grounding tab.

DESCRIPTION OF THE DRAWINGS—REFERENCE NUMERALS

The following list refers to the drawings:

TABLE B

Reference numbers

| Ref # | Description |
|---|---|
| 30 | Electro Static Discharge (ESD) Safe Liner 30 |
| 30A | alternative embodiment 30A as a three layer Electro Static Discharge (ESD) Safe Liner |
| 31 | top cuff (A) 31 |
| 32 | shaped (tubular, rectangular or other regular or irregularly shaped polygonal cross-sectioned configuration) side(B) 32 consisting of a single carbon filled thermoplastic sheet such as ethyl vinyl acetate (EVA) or the like essentially 12-15 mils thick |
| 32A | shaped (tubular, rectangular or other regular or irregularly shaped polygonal cross-sectioned configuration) side(B) 32A consisting of a laminate inner and outer sheet and a middle woven fabric for additional strength such as low density polyethylene (LDPE) or the like |
| 33 | means for connecting 33 top cuff 31 to tubular side 32, 32A such as a horizontal ultrasonic seam weld or heat weld, or equal |
| 34 | bottom disk or surface(C) 34 |
| 35 | means for connecting 35 bottom disk 34 to tubular side 32, 32A such as an ultrasonic weld or heat weld along the perimeter (P) of the disk 34 |

TABLE B-continued

Reference numbers

| Ref # | Description |
|---|---|
| 36 | means for connecting 36 ends or vertical seam of top cuff 31(A) and/or tubular side(B) 32, 32A - vertical ultrasonic weld, heat weld, or equal |
| 37 | grounding tab 37 |
| 38 | means to connect 38 grounding tab 37 to liner cuff 31 or liner 30 |
| 39 | conductor strap 39 to ground 39A |
| 39A | ground 39A |
| 40 | container 40 of various shapes such as square, rectangular, spherical, oblong or equal (as examples and not as limitations) |
| 40A | contiguous and similarly shaped lid 40A of container 40 |
| 40B | Agitator, motor, shaft and blade assembly 40B on lid 40A of container 40 |
| 41 | top edge/ring 41 of container 40 |
| 41A | drum lid bolt ring 41A |
| 42 | bottom 42 or container 40 |
| 43 | side 43 of container 40 |
| 44 | rectangular or square container 44 with liner device 30 |
| 45 | spherical or oblong/oval barrel container 45 with liner device 30 |
| 50 | ESD static dissipative chart 50 showing the surface resistance spectrum |
| 51 | ESD surface resistivity meter 51 |
| 52 | requirements 52 for ESD safe lining 30 |
| 60 | carbon loaded thermoplastic 60 |
| 60A | carbon loaded LDPE 60A |
| 61 | coated LDPE weave 61 with carbon strip 62 |
| 62 | carbon strip 62 |
| 63 | aluminum foil roll 63 |
| 64 | aluminum coated LDPE 64 |
| 65 | blow mold LDPE 65 |
| 66 | blow mold LPDE dissipative 66 |
| 67 | LPDE clear liner 67 |
| 68 | standard fifty-five (55) gallon drum 68 (metal or plastic) |
| 69 | drum sealing mechanism 69 to removably connect drum 68 to drum top 70 |
| 70 | drum top 70 |
| 71 | IBC liner 71 |
| 71A | barrel liner 71A |
| 72 | Hanlon Solutions Resource (HSR) liner 72 |
| 73 | woven poly ethylene 73 |
| 74 | laminated material trial 74 |
| CFT | carbon filled thermoplastic such as EVA, LDPE, new composites of thermoplastic films, etc. |
| EVA | ethyl vinyl acetate EVA |
| LDPE | low density poly ethylene LDPE |
| MVTR | moisture vapor transfer rate MVTR |
| 80A | carbon black LDPE static dissipative film 80A |
| 80B | LOW density poly ethylene LDPE woven static dissipative fabric 80B |
| 90 | specification sheet 90 for device 30 |
| 100 | meter operator 100 |

DETAILED DESCRIPTION OF PREFERRED EMBODIMENT

The present development is an Electro Static Discharge (ESD) Safe Liner for various totes and other containers holding various volatile materials in general. This invention is directed generally to containers, and more particularly to intermediate bulk containers (IBCs) or liners with safety features for static dissipation to prevent an electrostatic discharge (ESD). It relates to a container liner for protecting a reusable or recyclable rigid metal container from contamination or exposure to a flammable liquid or one susceptible to ESD which is being contained therein. More particularly, the invention is directed toward providing a static dissipative container liner which will serve as an effective barrier for preventing a liquid which is being held within a metal or conductive container from contacting the walls thereof, and which has suitable static dissipative properties to reduce or eliminate the risk of electrostatic discharges which could ignite flammable vapors and/or liquid contacting the container liner. The present invention also relates to a static dissipative laminate. More particularly, the present invention relates to a static dissipative film and a static dissipative fiber and the like, which are superior in static dissipative properties. This can relate to the manufacture of intermediate bulk containers (hereinafter bulk bags) for handling flowable materials, and in particular to the manufacture of static dissipative films for use in bulk bag liners and to the manufacture of static dissipative fabrics for use in bulk bags. This device and invention relates generally to the transportation of devices sensitive to electrostatic discharge (ESD), and more particularly to a transportable bag assembly that provides ESD protection for the contents thereof. These include devices for reduced energy of electrostatic discharge that are suitable for use in combustible environments. This invention finally relates to groundable type flexible fabric containers with a reduced energy of electrostatic discharge suitable for use in a combustible environment.

The advantages for the Electro Static Discharge (ESD) Safe Liner device 30 for various paint totes and other containers are listed above in the introduction. Succinctly the benefits are that the device:
Is produced from high quality and clean materials
Supports environmental control of solvents
Supports zero waste to land fills
Allows repurposed material and by products
saves cost of chemicals, shipping, more power and product rejections
Provides time saving and more uptime to the service process and equipment The preferred embodiment of the Electro Static Discharge (ESD) Safe Liner device 30 for various totes and other containers is comprised of: (a) an approximately 12-15 mil thick carbon filled thermoplastic shaped side liner attached directly and contiguously to an approximately 12-15 mil thick carbon filled thermoplastic bottom; (b) a single and an approximately 4 mil thick carbon filled thermoplastic layer and static dissipative cuff contiguously attached to the three layer static dissipative liner; and (c) a grounding tab attached to the cuff by a conductive means for securing wherein the ESD safe liner device is placed interior to a durable container to provide a ground able and removable liner for safeguarding materials held in the container from electrostatic discharges and the like when the liner is attached to a local ground. An alternative embodiment is a three layered laminated sheet with a carbon loaded inner and outer sheet and middle sheet of a woven static dissipative fabric. Another embodiment is the device without cuff section and the ground tab attached to the top perimeter of the shaped side.

There are shown in FIGS. 1-9 a complete description and operative embodiment of the Electro Static Discharge (ESD) Safe Liner device 30 for various paint totes and other containers. In the drawings and illustrations, one notes well that the FIGS. 1-9 demonstrate the general configuration and use of this product. The various example uses are in the operation and use section, below.

The accompanying drawings, which are incorporated in and constitute a part of this specification, illustrate an embodiment of the Electro Static Discharge (ESD) Safe Liner device 30 for various paint totes and other containers that is preferred. The drawings together with the summary description given above and a detailed description given below serve to explain the principles of the ESD device 30.

It is understood, however, that the ESD device 30 is not limited to only the precise arrangements and instrumentalities shown. Other examples of ESD devices and uses are still understood by one skilled in the art of containers and liners requiring electro static discharge (ESD) protection can be readily adapted under this concept within the scope and spirit shown here.

FIGS. 1A through 1C are sketches of the general electro static discharge (ESD) safe liner device 30 for container liners and packaging applications as components, as assembled and as a sheet/liner/film with an enlarged grounding tab. Shown and demonstrated in these sketches are: an Electro Static Discharge (ESD) Safe Liner 30 with a top cuff(A) 31; a shaped tubular side(B) 32 shaped (tubular, rectangular or other regular or irregularly shaped polygonal cross-sectioned configuration) side(B) 32 consisting of a single carbon filed thermoplastic sheet such as ethyl vinyl acetate (EVA) or the like essentially 12-15 mils thick, and the shaped side 32 having a top and bottom perimeter; a means for connecting 33 top cuff 31 to tubular side 32, at the top perimeter, such as a horizontal ultrasonic seam weld or heat weld; a bottom disk or surface(C) 34; a means for connecting 35 bottom disk 34 to tubular side 32 such as an ultrasonic weld or heat weld along the perimeter (P) of the disk 34 and the bottom perimeter of the shaped side 32; a means for connecting 36 ends or vertical seam of top cuff 31(A) and/or tubular side(B) 32—the means being a vertical ultrasonic weld, heat weld, or equal; a grounding tab 37; a means to connect 38 the grounding tab 37 to liner cuff 31; a conductor strap 39 to ground 39A; a ground 39A; a container 40 of various shapes such as square, rectangular, spherical, oblong or equal (as examples and not as limitations); a contiguous and similarly shaped lid 40A of container 40; an agitator, motor, shaft and blade assembly 40B on lid 40A of container 40; a top edge/ring 41 of container 40; and a drum lid bolt ring 41A. One notes well that the conductor strap 39 may be a solid or woven copper, aluminum, or carbon loaded composite material. Another embodiment is the device without cuff section 31 and the ground tab 37 attached to the top perimeter of the shaped side 32.

FIG. 2 is another sketch of the general electrostatic discharge (ESD) safe liner device 30, 30A with components and features noted. Provided here are sketches of the original prototype that shows: an Electro Static Discharge (ESD) Safe Liner 30, 30A; a top cuff (A) 31; a shaped tubular side(B) 32, 32A; a bottom disk or surface (C) 34; a means for connecting 35 bottom disk 34 to tubular side 32, 32A such as an ultrasonic weld or heat weld along the perimeter (P) of the disk 34; a means for connecting 36 ends or vertical seam of top cuff 31(A) and/or tubular side 32, 32A (B)—vertical ultrasonic weld or heat weld or equal; a grounding tab 37; a means to connect 38 the grounding tab 37 to liner cuff 31 or liner 30; a top edge/ring 41 of container 40; and a perimeter (P).

FIG. 3A through 3C are sketches of the ESD design and typical configuration switch the components and features shown from generally a side and isometric views. In these views are depicted the following: a top cuff (A) 31; a shaped tubular side(B) 32, 32A; a bottom disk or surface (C) 34; a means for connecting 35 bottom disk 34 to tubular side 32, 32A such as an ultrasonic weld or heat weld along the perimeter (P) of the disk 34; a means for connecting 36 ends or vertical seam of top cuff 31(A) and/or tubular side(B) 32, 32A—vertical ultrasonic weld, or heat weld, or equal; a container 40 of various shapes such as square, rectangular, spherical, oblong or equal (as examples and not as limitations); a rectangular or square container 44 with liner device 30; and a spherical or oblong/oval barrel container 45 with liner device 30.

FIG. 4 is a chart 50 of the ESD and surface resistance spectrum. The ESD static dissipative chart 50 shows the surface resistance spectrum of various materials. While the general electrostatic discharge (ESD) safe liner device 30, 30A are developed for static discharge applications, the configurations and methods are capable of using a pure conductive film for special applications. If a customer or application needs the conductive film, the safe line devices can accommodate with a change in surface resistance to conductive on the spectrum chart.

FIGS. 5A and 5B are sketches of a film surface resistivity meter 51 and the recommended ESD requirements 52 for a safe liner. The resistivity meter 51 is shown being used by an operator 100.

The evolution of this invention can benefit one to understand its uniqueness. Some simple definitions for this evolution include: low density poly ethylene (LDPE), moisture vapor transfer rate (MVTR), and carbon filled thermoplastics such as ethyl vinyl acetate (EVA). The evolution shows: static dissipative Liners are not new; static dissipative container liners are not new; pliable film, static dissipative, container liners are not new; and rigid, static dissipative, container liners are not new. But a combination of all and for a specific purpose because of their individual usefulness is not only new but unique. It was discovered or revealed that the industry was essentially in need of a container liner that would help eliminate waste and reduce quality issues from contamination.

Hanlon Solutions Resource (HSR) researched and developed a device and combination liner that would meet the needed industry requirements. The first container held coatings and dispensed them in a manner found suitable; however 1.) The container material was not resistant to the variety of coatings chemistry causing container material failure;
2.) It was not compatible to the container from a contamination standpoint; and
3.) It was not a safe material from an ESD standpoint where volatile chemicals were present.

The development and search continued. The next discovery was pliable and conductive container liners. They were resistant to coatings and their severe chemistry. They were safe from an ESD standpoint based on the understanding at that point. Trials of numerous applications and had substantial success. The learning process continued!

There were a number of considerations involved and which may be confusing for some to understand. An initial concern was with the "Surface Resistivity" of the products. The "Surface Resistivity" needed to maintain a "Static Dissipation" level acceptable for the environment the industry would experience. The Liners were next made from Carbon Filled LDPE and had a "Surface Resistivity" level of ten squared ($10^2$). This level was considered to be "Conductive" and a conductive level in that range was not acceptable. There are varying schools of thought on safe "Surface Resistivity" levels and a conductive level apparently is not suitable in most industrial working environments. Hanlon Solutions Resource (HSR) researched and understands the science behind this process. The customer feedback revealed that the chemistry of the liners could be regulated to provide whatever "Surface Resistivity" level one wanted. It was established that the "Surface Resistivity" level needed to be in the "Static Dissipative" range that started at greater than ten to the fourth power (>10$^4$) and extended to less than ten to the thirteenth power (<10$^{13}$). This range resulted in a controversy that was eventually resolved. Based on materials tested and a recent ESD occurrence at a large printing facility in the Mid-West, it was determined that Static Dissipative products that measure in the "Static Dissipative" level of greater than ten to the ninth power (>10$^9$) do not always adequately provide the resistivity capability for safety. Consequently HSR targeted and designed the liner material 30 for "Surface Resistivity" levels between ten to the fourth and ten to the ninth power (10$^4$-10$^9$). In addition the materials with the carbon filling retain the "Surface Resistivity" levels in spite of humidity levels and contact with solvents. The majority of products currently used in this environment rely on a material with an anti-static blend into the polymer where its performance is based on environmental humidity levels and is not resistant (the anti-static blend is rendered ineffective) to common solvents found in industrial coatings, the very solvents they are designed to protect against.

Hanlon Solutions Resource (HSR) also faced the structural advantages and disadvantages of a film versus rigid materials. Films lack structural stability inside of containers and tear easily especially where agitators are concerned but offer compactness for shipping and disposal. Rigid liners provide structural stability and durability but lack flexibility. Rigid containers are usually molded and provide a good fit but are overly bulky and are a volume problem during shipping and disposal (due to their un-flattened, non-compact geometry and size). The HSR solution was originally a coated woven material that offered structural stability and durability yet was not bulky. Used in conjunction with carbon filled film that could be made compact during shipment and disposal. The key advantage to the addition of the film cuff is it that drapes over the top of the container as a cuff and does not inhibit but adds to the sealing capabilities of the container lid. However, molding of the woven material is more difficult and thereby placed this configuration as an alternative embodiment. The final embodiment was a tubular side and bottom of carbon filled thermoplastic thick enough to offer structural stability—essentially 12-15 mils thick—as the preferred option. Upon removal the overall design lends itself to an efficient easily closable and compact disposal and containment unit. Meeting local disposal and environmental codes these units can be used as fuel for industrial kilns.

So now HSR has addressed the issues and provides a solution that is:

1.) Resistant to the materials and coatings it contains;
2.) Is consistently clean providing protection from outside contamination;
3.) meets acceptable ESD safety requirements that include a grounding tag clearly identified and easily accessible; The bonus areas are that it:
4.) Provides increased environmental advantages by eliminating volatile cleaning materials and contained disposal; and
5.) Cost saving provided by less manpower, cleaning materials and transportation.

Hanlon Solutions Resource (HSR) has determined and concluded that the needs of what is currently not available and that has effectively made an inclusive yet simple design that will serve an industrial need and prove useful.

FIGS. 6 A through 6 H are sketches and comparison of various films and containers for ESD protection. Here is viewed: carbon loaded LDPE 60; coated LDPE weave 61 with carbon strip 62; a carbon strip 62; an aluminum foil roll 63; aluminum coated LDPE 64; blow mold LDPE 65; blow mold LPDE dissipative 66; LPDE clear liner 67; standard fifty-five (55) gallon drum 68 (metal or plastic); drum sealing mechanism 69 to removably connect drum 68 to drum top 70; and a drum top 70. These are compared with the ultimate Hanlon Solutions Resource (HSR) or invention here known as the Electro Static Discharge (ESD) Safe Liner 30.

FIG. 6 A indicates carbon loaded LDPE Film 60 that shows—Similarities: moisture vapor transfer rate MTVR, Good solvent resistant, radio frequency RF weld capable, easy access, clean-cut edges. Differences: brittle, low tensile strength, poor weld adherence, easily punctured, non-durable, low gauge.

FIG. 6 B is a coated LDPE weave 61 with a carbon strip 62 that shows—Similarities: MVTR, durable/sturdy, mid-gauge, solvent resistant, easy access and Differences: inconsistent conductivity, inability to RF weld, difficulty grounding, cut edges fray, quality/cleanliness issues.

FIG. 6 C is an aluminum foil roll 63 that demonstrates—Similarities: highly conductive, clean-cut edges, easy access, and Differences: no tensile strength, easily punctured, poor solvent resistance, non-durable, poor weld strength.

FIG. 6 D shows an Aluminum Coated LDPE 64 that reveals—Similarities: highly conductive, easy access, durable, clean-cut edges, similar substrate and Differences: poor weld strength to substrate.

FIG. 6 E is a Blow Mold LDPE 65 which demonstrates—Similarities: MVTR, solvent resistance, high puncture resistance, durable, clean-cut, and easy access Differences: non-conductive/ground able, higher production cost, high shipping cost, poor lid closure/seal ability, and poor ground ability.

FIG. 6 F is a Blow Mold LDPE Dissipative 66 that indicates—Similarities: MVTR, solvent resistance, high puncture resistance, durable, clean-cut, and easy access Differences: non-conductive/ground able, lower production cost, higher shipping cost, static dissipative capability is questionable as is conductive compatibility.

FIG. 6 G LDPE Clear Liner 67 in a fifty five (55) gallon drum 68 which provides—Similarities: clean-cut, easy access, inexpensive. Differences: Non-Resistant to solvent, non-conductive/ground able, low cost, easily punctured, non-durable FIG. 6 H is a standard fifty five (55) gallon drum 68 with a closure ring 69 and a lid 70. These provide—Similarities: clean-cut, easy access, very durable, puncture resistant, and solvent resistant, Differences: high cost, high disposal fees, not environmentally friendly (longevity of materials in landfills).

FIGS. 7 A through 7 F are sketches of the material evaluation for achieving an ESD safe device. Here are shown an Electro Static Discharge (ESD) Safe Liner 30; a standard fifty-five (55) gallon drum 68 (metal or plastic); an IBC liner 71; a barrel liner 71A; a Hanlon Solution Resource liner 72 (a/k/a the invention device 30); woven poly ethylene 73; and a laminated material trial 74. In these views, FIG. 7 A shows existing IBC liners 71, 71A usually made from LDPE blends or vinyl. It works well with non-volatile materials in light-duty chemical environments. The harsh environment and processes required more durable liners. In addition, safety requirements made it so the liner needed to have grounding capabilities.

FIG. 7 B demonstrates the HSR discovered a carbon-loaded material 72 with a good moisture vapor transfer rate (MVTR) which was also solvent resistant. The material worked well with RF welding and could be manufactured into a variety of complex forms. The material is fairly strong and conductive, however, if it is punctured, the integrity of the film was ruined. Also when it is welded, the seams become weak and ten to fail numerous times during trial runs.

FIG. 7 C provides results that revealed the carbon-loaded film alone could not fulfill all the requirements to work in the environment at which HSR was looking. After it was researched a number of possibilities to strengthen the carbon loaded material and arrived at the conclusion HSR could re-inforce the materials by laminating the films together with a woven polyethylene PE 73. The next issue addressed was how to sandwich or laminate the three materials together and what process to use.

FIG. 7 D indicates HSR decided to laminate the materials 74 together with a light adhesive and have received very promising samples from the HSR supplier. This is light weight, highly conductive, re-inforced, tri-layer material fits all of the HSR liners that for ESD Safe requirements and has worked extremely well in all of the HSR tests. This project has evolved tremendously since the initial designs by HSR. Every single set-back has forced HSR to create a better and smarter design, ultimately leading to a very durable, high quality material that is going to be very popular in a number of industries and applications.

FIG. 7 E teaches the HSR laminate that is an alternative embodiment to begin manufacturing fifty-five (55) gallon drum liners 30A for its customer in the coatings industry. Hanlon Solutions Resource (HSR) had a very simple laminate design as this concept. The success of this laminate material will ultimately allow HSR to gradually create larger and more complex liners in other industries outside of the coating container. The material and its manufacturability itself determines the success of this embodiment. It has high strength with the woven fabric but requires some additional care and production costs with the mold ability of the shaped sides and the bottom to gain excellent seam integrity.

FIG. 7 F teaches the HSR the preferred embodiment to begin manufacturing fifty-five (55) gallon drum liners 30 for its customer in the coatings industry. Hanlon Solutions Resource (HSR) has a very simple design as this concept including the shaped sides 32 and bottom 33 with a top cuff 31 that has the grounding tab 37 connection to connect to the local grounding strap 39 and on to the ground 39. The success of what HSR is attributed entirely to the material and configuration it has been able to develop. The uniqueness and versatility of both embodiments—the preferred thermoplastic EVA film and the alternate LDPE woven laminate material will open the doors to limitless applications and industries in need of great static dissipation containment.

The development and processes used to manufacture the ESD safe liner 30 demonstrated and revealed many things:
A. Semi rigid yet flexible structure provides more space for shipping, storage and fully contained disposal.
B. The ESD safe product contains two distinctly different materials providing two distinctly different requirements of the liner design. A flexible 4 mil cuff film that adapts and provides a seal for the lid and also provides the capability to effectively seal off the liner once removed for residual containment.
C. All parts are ultrasonically or heat welded with no introduction of additional material (contaminants) such as adhesives or mechanical fasteners.
D. Liner material construction is designed specifically for Volatile ESD applications and not specifically for the containers. Although metal containers provide a more suitable structural atmosphere, non-metallic (plastic) containers can be used in an ESD environment providing that these containers utilize ESD safe liners that are properly grounded.

FIG. 8 is a sketch of the layers used to provide the alternative laminate ESD safe liner. Here is shown the Electro Static Discharge (ESD) Safe Liner 30A; the carbon black LDPE conductive film 80A; and the LOW density poly ethylene LDPE woven fabric 80B of the Electro Static Discharge (ESD) Safe Liner 30A. The center woven fabric 80B has each of the outer films 80A applied in two passes as the sonic weld essentially "melts" the film into the fabric for a non-insulative yet dissipative and strong liner 30A.

FIGS. 9 A through 9 C are sketches of the alternative embodiment for an electro static discharge (ESD) safe liner device 30A for container liners and packaging applications as components, as assembled and as a sheet/liner/film with an enlarged grounding tab. Shown and demonstrated in these sketches are: an Electro Static Discharge (ESD) Safe Liner 30A with a top cuff(A) 31; a shaped (tubular, rectangular or other regular or irregularly shaped polygonal cross-sectioned configuration) side(B) 32A consisting of a laminate inner and outer sheet and a middle woven fabric for additional strength such as low density polyethylene (LDPE) or the like; a means for connecting 33 top cuff 31 to tubular side 32A such as a horizontal ultrasonic seam weld or heat weld; a bottom disk or surface(C) 34; a means for connecting 35 bottom disk 34 to tubular side 32A such as an ultrasonic weld or heat weld along the perimeter (P) of the disk 34; a means for connecting 36 ends or vertical seam of top cuff 31(A) and/or three (3) piece/tubular side(B) 32A—the means being a vertical ultrasonic weld, heat weld, or equal; a grounding tab 37; a means to connect 38 the grounding tab 37 to liner cuff 31; a conductor strap 39 to ground 39A; a ground 39A; a container 40 of various shapes such as square, rectangular, spherical, oblong or equal (as examples and not as limitations); a contiguous and similarly shaped lid 40A of container 40; an agitator, motor, shaft and blade assembly 40B on lid 40A of container 40; a top edge/ring 41 of container 40; and a drum lid bolt ring 41A. One notes well that the conductor strap 39 may be a solid or woven copper, aluminum, or carbon loaded composite material.

The details mentioned here are exemplary and not limiting. Other specific components and manners of describing a Electro Static Discharge (ESD) Safe Liner device 30 for various paint totes and other containers may be added as a person having ordinary skill in the field of the art of containers and liners requiring electro static discharge (ESD) protection. It is readily understood that the features shown in the examples with this product are readily adapted to other types of liners and container requiring protection for ESD devices and their uses well appreciates.

OPERATION OF THE PREFERRED EMBODIMENT

The Electro Static Discharge (ESD) Safe Liner device 30 for various paint totes and other containers has been described in the above embodiment. The manner of how the device operates is described below. One notes well that the description above and the operation described here must be taken together to fully illustrate the concept of the device 30. The preferred embodiment of the Electro Static Discharge (ESD) Safe Liner device 30 for various totes and other containers is comprised of: (a) an approximately 12-15 mil thick carbon filled thermoplastic shaped side liner attached directly and contiguously to an approximately 12-15 mil thick carbon filled thermoplastic bottom; (b) a single and an approximately 4 mil thick carbon filled thermoplastic layer and static dissipative cuff contiguously attached to the three layer static dissipative liner; and (c) a grounding tab attached to the cuff by a conductive means for securing wherein the ESD safe liner device is placed interior to a durable container to provide a ground able and removable liner for safeguarding materials held in the container from electrostatic discharges and the like when the liner is attached to a local ground. An alternative embodiment is a three layered laminated sheet with a carbon loaded inner and outer sheet and middle sheet of a woven static dissipative fabric.

The Electro Static Discharge (ESD) Safe Liner device 30 for various totes and other containers operates with full safety in mind. The liner 30 is first placed into a container 40. Next, the grounding device 37 is connected to a grounding lead 39 and ground 39A. Now the container 40 with its ESD safe liner 30 may be filled with the (volatile) material. At any subsequent point of transport (inter plant on a fork truck or transport device), in the interplant transports (by truck or rail); and at the ultimate use point, the liner 30 is grounded by the local ground strap 39 connected to the liner ground connection 37. Once the material is essentially all used and only minimal waste is remaining, the liner 30 can be removed from the container 40 and disposed of properly. This keeps the container 40 free of residual materials and ready for immediate re-use.

Many uses are anticipated for the Electro Static Discharge (ESD) Safe Liner device 30 for various paint totes and other containers. Some examples, and not limitations, are shown in the following Table.

| ITEM | DESCRIPTION |
| --- | --- |
| 1 | paints and surface coatings |
| 2 | chemical materials |
| 3 | minerals |
| 4 | fertilizers |
| 5 | foodstuffs |
| 6 | grains and agricultural products |
| 7 | petroleum products |
| 8 | ores |
| 9 | flammable metals |
| 10 | bulk grains |
| 11 | pharmaceuticals |
| 12 | ink and solvent based materials |

With this description it is to be understood that the Electro Static Discharge (ESD) Safe Liner device 30 for various paint totes and other containers is not to be limited to only the disclosed embodiment of product. The features of the Electro Static Discharge (ESD) Safe Liner device 30 for various paint totes and other containers are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

What is claimed is:

1. An Electro Static Discharge (ESD) Safe Liner device (30) for a tote and a group of containers comprising:
   (a) an approximately 12-15 mil thick carbon filled thermoplastic, static dissipative shaped side liner, with a top and a bottom perimeter, the shaped side liner attached directly and contiguously to an approximately 12-15 mil thick carbon filled thermoplastic bottom at the bottom perimeter;
   (b) the carbon filled thermoplastic bottom;
   (c) a single and an approximately 4 mil thick carbon filled thermoplastic layer and static dissipative cuff contiguously attached to the top perimeter of the carbon filled thermoplastic, shaped side of the static dissipative liner; and
   (d) a grounding tab attached to the cuff by a conductive means for securing wherein the ESD safe liner device is placed interior to a durable container
   wherein the device provides a ground able and removable liner for safeguarding materials held in the tote and the group of container from electro-static discharges when the liner is attached to a local ground.

2. The Electro Static Discharge (ESD) Safe Liner device (30) according to claim 1 wherein the thermoplastic, static dissipative liner is made of Ethylene Vinyl Acetate (EVA).

3. The Electro Static Discharge (ESD) Safe Liner device (30) according to claim 1 wherein the material of the ground (39) is selected from the group consisting of aluminum, copper, and carbon loaded composite material.

4. The Electro Static Discharge (ESD) Safe Liner device (30) according to claim 1 wherein the shaped side is selected from the group consisting of tubular, rectangular, regular shaped polygonal cross-sectioned configuration, and irregularly shaped polygonal cross-sectioned configurations.

5. An Electro Static Discharge (ESD) Safe Liner device (30) for a tote and a group of containers comprising:
   (a) an approximately 12-15 mil thick carbon filled thermoplastic, static dissipative shaped side liner, with a top and a bottom perimeter, attached directly and contiguously to an approximately 12-15 mil thick carbon filled thermoplastic bottom at the bottom perimeter;
   (b) the carbon filled thermoplastic bottom; and
   (c) a grounding tab attached to the top perimeter of the shaped side liner by a conductive means for securing wherein the ESD safe liner device is placed interior to a durable container
   wherein the device provides a ground able and removable liner for safeguarding materials held in the tote and the group of container from electro-static discharges when the liner is attached to a local ground.

6. The Electro Static Discharge (ESD) Safe Liner device (30) according to claim 5 wherein the thermoplastic, static dissipative liner is made of Ethylene Vinyl Acetate (EVA).

7. The Electro Static Discharge (ESD) Safe Liner device (30) according to claim 5 wherein the shaped side is selected from the group consisting of tubular, rectangular, regular shaped polygonal cross-sectioned configuration, and irregularly shaped polygonal cross-sectioned configurations.

8. The Electro Static Discharge (ESD) Safe Liner device (30) according to claim 5 wherein the material of the ground (39) is selected from the group consisting of aluminum, copper, and carbon loaded composite material.

9. An Electro Static Discharge (ESD) Safe Liner device 30 for various totes and other containers is comprised of:
   (a) three layer shaped side thermoplastic, carbon filled liner attached directly and contiguously to a three layer bottom wherein the layers are further comprised as a middle woven layer with two outer static dissipative layers;
   (b) a single layer static dissipative cuff contiguously attached to the three layer liner; and
   (c) a grounding tab attached to the cuff by a conductive means for securing
   wherein the ESD safe liner device is placed interior to a durable container to provide a ground able and removable liner for safeguarding materials held in the container from electro-static discharges and the like when the liner is attached to a local ground.

10. The Electro Static Discharge (ESD) Safe Liner device (30A) according to claim 9 wherein the material of the ground (39) is selected from the group consisting of aluminum, copper, and carbon loaded composite material.

11. The Electro Static Discharge (ESD) Safe Liner device (30A) according to claim 9 wherein the shaped side is selected from the group consisting of tubular, rectangular, regular shaped polygonal cross-sectioned configuration, and irregularly shaped polygonal cross-sectioned configurations.

12. The Electro Static Discharge (ESD) Safe Liner device (30A) according to claim 9 wherein the thermoplastic, static dissipative liner is made of Low Density Polyethylene (LDPE).

* * * * *